United States Patent
Caswell et al.

(10) Patent No.: US 7,945,041 B2
(45) Date of Patent: May 17, 2011

(54) METHOD, SYSTEM AND PROGRAM PRODUCT FOR MANAGING A CUSTOMER REQUEST

(75) Inventors: Nathan S. Caswell, Yorktown Heights, NY (US); Jeffrey D. Gilley, New Albany, IN (US); Drew A. Kightlinger, Indianapolis, IN (US); Deborah M. Putt, Chester Springs, PA (US)

(73) Assignee: International Business Machines Corporation, Armonk, NY (US)

( * ) Notice: Subject to any disclaimer, the term of this patent is extended or adjusted under 35 U.S.C. 154(b) by 1755 days.

(21) Appl. No.: 11/140,658

(22) Filed: May 27, 2005

(65) Prior Publication Data
US 2007/0005536 A1 Jan. 4, 2007

(51) Int. Cl.
*H04M 3/00* (2006.01)
(52) U.S. Cl. ............... 379/265.01; 379/265.09
(58) Field of Classification Search .......... 379/265.01–265.14, 266.01–266.1, 379/309
See application file for complete search history.

(56) References Cited

U.S. PATENT DOCUMENTS

| | | | |
|---|---|---|---|
| 6,415,259 B1* | 7/2002 | Wolfinger et al. | 705/8 |
| 6,937,993 B1* | 8/2005 | Gabbita et al. | 705/8 |
| 6,985,886 B1* | 1/2006 | Broadbent et al. | 705/38 |
| 7,197,749 B2* | 3/2007 | Thornton et al. | 718/101 |
| 2001/0047286 A1 | 11/2001 | Walker et al. | |
| 2002/0016757 A1 | 2/2002 | Johnson et al. | |
| 2002/0078130 A1* | 6/2002 | Thornton et al. | 709/201 |
| 2003/0115073 A1 | 6/2003 | Todd et al. | |
| 2003/0131049 A1 | 7/2003 | Banerjee et al. | |
| 2004/0015368 A1 | 1/2004 | Potter et al. | |
| 2004/0078209 A1 | 4/2004 | Thomson | |
| 2004/0133460 A1 | 7/2004 | Berlin et al. | |
| 2004/0133656 A1 | 7/2004 | Butterworth et al. | |
| 2004/0148373 A1 | 7/2004 | Childress et al. | |
| 2004/0193468 A1 | 9/2004 | Mosquera et al. | |
| 2004/0194097 A1 | 9/2004 | Spencer | |
| 2005/0015292 A1 | 1/2005 | Wilson et al. | |
| 2008/0086564 A1* | 4/2008 | Putman et al. | 709/227 |
| 2008/0109452 A1* | 5/2008 | Patterson | 707/10 |

FOREIGN PATENT DOCUMENTS

| | | |
|---|---|---|
| JP | 2004030204 A | 6/2002 |
| SE | 9804572 | 12/1998 |

OTHER PUBLICATIONS

Iyengar, "Method for Dynamically Routing Web Requests to Different Web Servers", IBM Technical Disclosure Bulletin, vol. 40, No. 12, Dec. 1997, pp. 5-8.

* cited by examiner

*Primary Examiner* — William J Deane
(74) *Attorney, Agent, or Firm* — Anna Linne; Hoffman Warnick LLC

(57) ABSTRACT

Under the present invention, a request for a composite service is received from a customer. Based on the request, a delivery task list including one or more tasks required to fulfill the request is defined. The tasks are each then assigned to a service provider for performance, and a schedule for their performance is determined. As the tasks are being performed, a tracking a status thereof is tracked. Once the tasks have been completed, the customer is notified, surveyed and/or invoiced.

24 Claims, 4 Drawing Sheets

METHOD, SYSTEM AND PROGRAM PRODUCT FOR MANAGING A CUSTOMER REQUEST

FIELD OF THE INVENTION

In general, the present invention provides a method, system and program product for managing a customer request. Specifically, the present invention provides a way to automatically coordinate and deliver complex, managed services (e.g., composite services) that require multiple providers to fulfill.

BACKGROUND OF THE INVENTION

As computer infrastructures continue to advance, many companies are attempting to provide customers with a more robust ordering system. For example, a typical company today will provide a website or the like through which a customer can select and order goods/services. Once an order is placed, the company can interface with any $3^{rd}$ party providers needed to fulfill the order. Unfortunately, many orders placed by customers today are "composite," which requires a complex series of coordinated efforts to fulfill. For example, a single order placed by a customer can require parts and/or services from multiple providers, which in turn requires substantial effort to manage. It could also be the case that an order placed by the customer requires completion of one or more of the tasks that are dependent upon completion of another task.

Heretofore, various approaches have been taken to provide management of customer requests. Unfortunately, none of these approaches is fully automated, rather, they require high levels of human intervention. Moreover, none of these approaches provides for coordination among multiple providers in fulfilling an order. To this extent, no existing approach allows interaction with multiple providers to be individually managed. Still yet, no existing approach provides a complete end-to-end system that not only manages customers and providers, but also provides surveying and invoicing upon completion of an order.

SUMMARY OF THE INVENTION

In general, the present invention provides a method, system and program product for managing a customer request. Specifically, the present invention provides a complete end-to-end order management system that can coordinate composite orders with customers and providers. Under the present invention, contract information is first loaded onto one or more databases. Typical contract information includes (1) services available to the customer; (2) a delivery task list associated with each service; (3) providers (e.g., service providers) associated with the delivery task list; and (3) parts and/or equipment that is part of the service. When a customer wishes to place an order, a customer profile will first be created. Then, via the web or voice, the customer will create a request for the service he/she wishes to be performed. A service order is then created to fulfill the request, and is placed into a planning/pending state while tasks from a corresponding delivery task list are assigned to the appropriate service provider with associated start and end dates/times. Once all tasks are scheduled, a status of the service order is changed to reflect the awaiting of customer concurrence of the schedule.

Upon approval from the customer, the service order moves into a "live service" order status. The associated tasks then flow to the appropriate work queues for activation and completion. As the provider gives updates (e.g., via the web or voice) corresponding to its performance and/or completion of the tasks, data is integrated to the appropriate databases and made available for the next operation. The next operation within the delivery task list is then automatically triggered to fall into the appropriate work queue.

If a task is not started on time, then an exception is sent to a different work queue (database) that is monitored by an administrator. In addition, the party that caused the exception (e.g., the customer or provider) will be notified. The administrator, based upon the exception type, typically knows what to do to clear the exception so the service can continue to be completed. Upon completion of the order, data is updated and a customer satisfaction and approval survey is triggered to be sent to the customer. Upon completion of the survey, the service is completed and the data is retained within the database for the life of the customer project. Thereafter, the appropriate data associated with the service order is updated as customer approved, billing information is then sent to the appropriate service provider, and invoices are generated. If the customer has support or maintenance contracts, appropriate serial number and other related data is sent to support application databases and entitlement databases.

A first aspect of the present invention provides a computer-implemented method for managing a request for a customer, comprising: receiving the request at an application; defining a delivery task list comprising one or more tasks required to fulfill the request; assigning a service provider to perform each of the one or more tasks; determining a schedule for individually performing each of the one or more tasks; tracking a status of each of the one or more tasks, wherein any failure to maintain the schedule is classified into one of a plurality of exception levels; and notifying the customer upon completion of the one or more tasks.

A second aspect of the present invention provides a system for managing a request for a customer, comprising: a system for receiving the request at an application; a system for defining a delivery task list comprising one or more tasks required to fulfill the request; a system for assigning a service provider to perform each of the one or more tasks; a system for determining a schedule for individually performing each of the one or more tasks; a system for tracking a status of each of the one or more tasks, wherein any failure to maintain the schedule is classified into one of a plurality of exception levels; and a system for notifying the customer upon completion of the one or more tasks.

A third aspect of the present invention provides a program product stored on a computer useable medium for managing a request for a customer, the computer useable medium comprising program code for causing a computer to perform the following functions: receive the request at an application; define a delivery task list comprising one or more tasks required to fulfill the request; assign a service provider to perform each of the one or more tasks; determine a schedule for individually performing each of the one or more tasks; track a status of each of the one or more tasks, wherein any failure to maintain the schedule is classified into one of a plurality of exception levels; and notify the customer upon completion of the one or more tasks.

A fourth aspect of the present invention provides a method for deploying an application for managing a request for a customer, comprising: providing a computer infrastructure being operable to: receive the request at the application; define a delivery task list comprising one or more tasks required to fulfill the request; assign a service provider to perform each of the one or more tasks; determine a schedule for individually performing each of the one or more tasks; track a status of each of the one or more tasks, wherein any failure to maintain the schedule is classified into one of a plurality of exception levels; and notify the customer upon completion of the one or more tasks.

A fifth aspect of the present invention provides computer software embodied in a propagated signal for managing a request for a customer, the computer software comprising instructions for causing a computer system to perform the following functions:
receive the request at an application; define a delivery task list comprising one or more tasks required to fulfill the request; assign a service provider to perform each of the one or more tasks; determine a schedule for individually performing each of the one or more tasks; track a status of each of the one or more tasks, wherein any failure to maintain the schedule is classified into one of a plurality of exception levels; and notify the customer upon completion of the one or more tasks.

Therefore, the present invention provides a method, system and program product for managing a request from a customer.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

Figure 1:
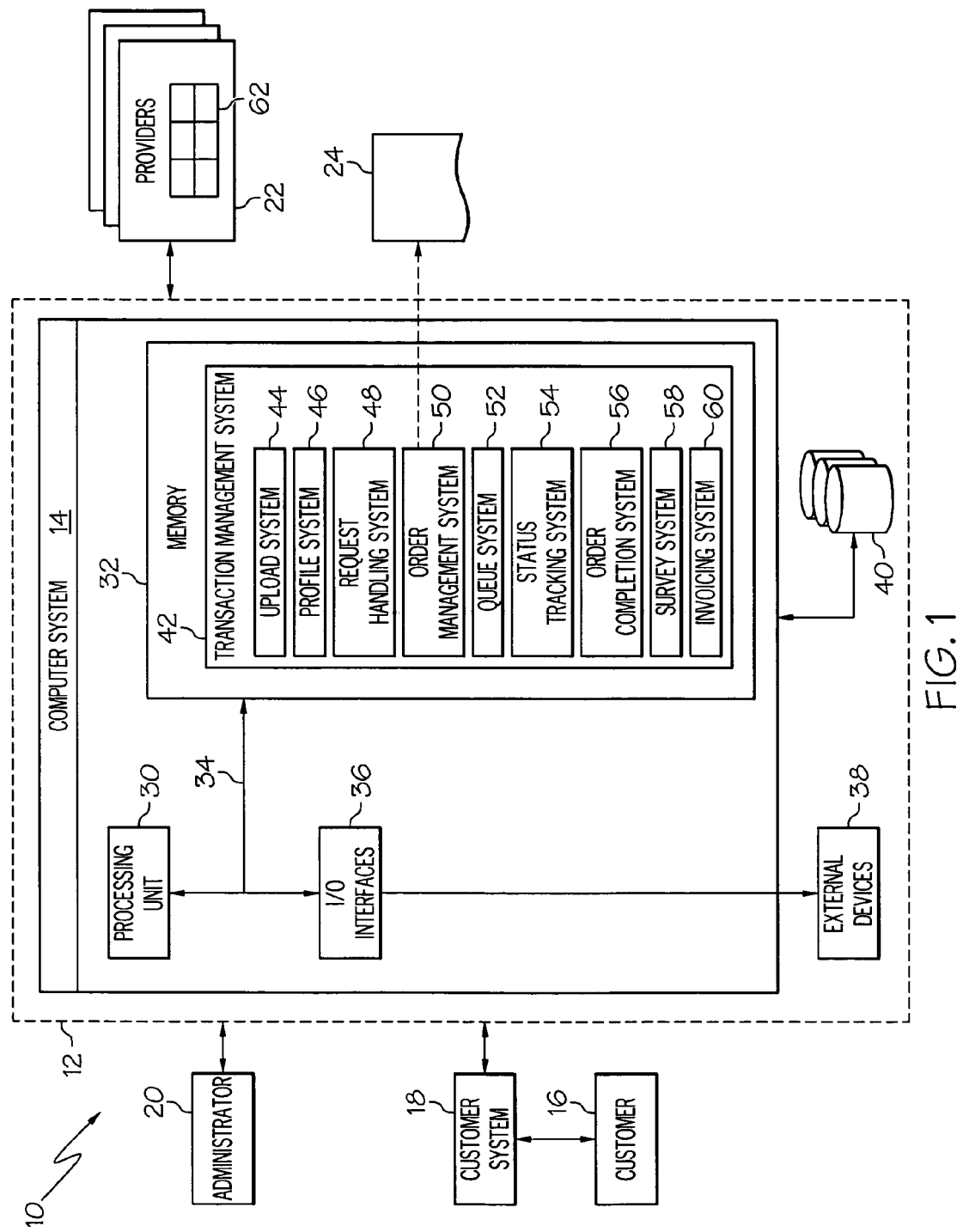
FIG. 1 depicts a system for managing a request from a customer according to the present invention.

For convenience purposes, the Best Mode for Carrying Out the Invention will have the following sections:
I. General Description
II. Computerized Implementation
I. General Description As indicated above, the present invention provides a system for end-to-end coordination (e.g., ordering, delivery, etc.) of complex, managed services, termed "composite services" for multiple customers. Composite services are typically performed by multiple providers of individual constituent services at multiple sites. The present invention provides efficient coordination between these individual services.

It should be understood that composite services may be parameterized under the present invention to create a range of composite services with the generally same end result. In such a case, a customer could select parameters to customize the service for their particular needs. Such parameters may include: (1) selection, de-selection or substitution of individual services, quality levels, a multiplicity of individual services or configuration elements; or (2) selection, de-selection, or substitution of configuration elements. In addition, under the present invention, operation does not depend on ownership. That is, the "customer" and "provider" may be the same or separate entity as the business performing the coordination activities. Still yet, as will be further described below, the present invention can implement "service templates." A service template is a delivery task list (e.g., a subset of a Project Management work breakdown structure) of one or more tasks required to provide an individual service selected from a list of available services, and a configuration of parts and assemblies whereby each part is selected from a list of available parts. The service templates may be a published product, a contractual agreement with a specific party, or a definition of an internal composite service. The mechanism for producing the service template and the content of the business state during execution can be substantially the same in each of these cases.

Among other things, the present invention provides the following features/advantages that are not provided by other approaches: (1) the present invention separates activities related to coordination of a composite service from activities related to performance of some individual service within the composite service; (2) the present invention separates a business state associated with customers (customer order, request or contract) from a business state associated with suppliers (supplier, service provider or provider order, request, or contract); (3) the present invention accounts for coordination and dependencies of individual services by structuring a plan such that individual services can be treated independently during execution. If each service completes as planned, the physical and informational context is such that any subsequent services can execute; (4) the present invention classifies any failure to perform tasks as expected (exceptions) during delivery execution into one of three levels: (a) those which can be handled within the context of an individual service, (b) those where coordination constraints require re-planning of multiple services to complete the composite service, and (c) those where completion of the composite service is not possible under the terms and conditions agreed upon with the customer; (5) the present invention allows lead time to optimize assignment of resources for individual services. Typically, project-oriented delivery of composite services based on "as soon as possible" requires constant rescheduling and shorter resource planning lead time leading to larger reserve capacity requirements for a particular customer service level; and (6) the present invention uses business state information to structure the operation, and explicitly maintain the business state information during execution. Normal problems of discovering elements of the business state for measurement purposes can be irrelevant as the whole of the business state is available at all times. Moreover, the availability of business state information can negate its need for discovering and handling exceptional situations. Under the present invention, "exceptions" are not handled outside the system or with a separate system, but are handled as an integral part of operational execution.

II. Computerized Implementation

Referring now to FIG. 1, a system 10 for managing requests from a customer 16 according to the present invention is shown. As shown, system 10 includes a computer system 14 deployed within a computer infrastructure 12. This is intended to demonstrate that the present invention could be implemented by a service provider who offers to manage customer requests for another entity. As further shown, computer system 14 communicates with customer system 18, administrator 20 and providers 22. In a typical embodiment, such communication occurs in a network environment (e.g., the Internet, a wide area network (WAN), a local area network (LAN), a virtual private network (VPN), etc.). Communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

In any event, computer system 14 is shown including a processing unit 30, a memory 32, a bus 34, and input/output (I/O) interfaces 36. Further, computer system 14 is shown in communication with external I/O devices/resources 38 and storage systems (e.g., databases) 40. In general, processing unit 30 executes computer program code, such as transaction management system 42, which is stored in memory 32 and/or storage systems 40. While executing computer program code, processing unit 30 can read and/or write data to/from memory 32, storage systems 40, and/or I/O interfaces 36. Bus 34 provides a communication link between each of the components in computer system 14. External devices 38 can comprise any devices (e.g., keyboard, pointing device, display, Interactive Voice Response Unit (IVR), etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer systems that can include numerous combinations of hardware and/or software. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 30 may comprise a single processing unit, or be distributed across one or more processing units in one or more locations, e.g., on a client and server. Similarly, memory 32 and/or storage systems 40 can comprise any combination of various types of data storage and/or transmission media that reside at one or more physical locations. Further, I/O interfaces 36 can comprise any system for exchanging information with one or more external devices 38. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 38 (e.g., a display) and/or storage system(s) 40 could be contained within computer system 14, not externally as shown.

In a typical embodiment, storage systems 40 are databases (hereinafter referred to as databases 40) capable of providing storage for information. Under the present invention, several types of information are stored in separate databases and/or records. Specifically, in a typical embodiment, a service delivery operation that takes place in the context of business has the following pre-constructed records: (1) a list of available services, where each service record contains information sufficient to describe the result, dependency on other parts or services, and duration of the service and costs associated with the service; (2) a list of available parts, where each part record contains information sufficient to describe the use, dependency on other parts or services of the part and costs associated with the part; (3) a set of customer records; (4) a set of site records; (5) a set of templates describing of all of the sets of managed services that are available to a particular customer. Each is referred to as a "service template." As mentioned above, a service template generally comprises a delivery task list (e.g., subset of a Project Management work breakdown structure) where each activity corresponds to an individual service from the list of available services and a configuration of parts and assemblies where each part is selected from the list of available parts; (6) a set of customer requests or orders for a composite service; and (7) a set of supplier orders for individual services.

To this extent, databases 40 could include one or more storage devices, such as a magnetic disk drive or an optical disk drive. In another embodiment, databases 40 include data distributed across, for example, a local area network (LAN), wide area network (WAN) or a storage area network (SAN) (not shown).

Although not shown, additional components, such as cache memory, communication systems, system software, etc., may be incorporated into computer system 14. In addition, customer 16 is shown communicating with computer system 14 via customer system 18, which is intended to represent any type of computerized device capable of such communication such as a handheld device, a laptop computer, a desktop computer, a work station, a client, a server, etc. It should be understood that although not shown for brevity purposes, customer system 18 will likely include computerized components similar to computer system 14. The same holds true for any computerized devices (not shown) used by administrator 20 and/or providers 22 to communicate with computer system 14.

Shown in memory 32 of computer system 14 is transaction management system 42 (e.g., an application such as a web or web portal application), which includes upload system 44, profile system 46, request handling system 48, order management system 50, queue system 52, status tracking system 54, order completion system 56, survey system 58 and invoicing system 60. As will be further described below, transaction management system 42 provides end-to-end coordination of customer requests for composite services. As is known, a composite service can require performance of multiple different providers 22. The present invention allows such performances to be individually managed (e.g., ordered, scheduled, tracked, handled, etc.).

Assume in an illustrative example that an entity operating computer system 14 wishes to make composite services available to customer 16 via providers 22. Under the present invention, contract information is first loaded onto one or more databases 40 via upload system 44 (e.g., by administrator 20). Typical contract information includes (1) services available to customer 16 (e.g., stored in database/record 1); (2) a delivery task list associated with each service (e.g., stored in database/record 2); (3) providers 22 (e.g., service providers) associated with the delivery task list (e.g., stored in databases/records 1 and 2); and (3) parts and/or equipment that is part of the service (e.g., stored in database/record 1). Once this information has been loaded, customer 16 and providers 22 can browse the available services through transaction management system 42. Before customer 16 or providers 22 can do this, however, they will first create respective profiles via profile system 46 (e.g., stored in database/record 1). This will allow customer 16 and providers 22 to later log into transaction management system 42 to view and/or request from the available services.

In any event, to interact with transaction management system 42 to create a profile, request services, check status of orders, etc., customer 16 will typically utilize a web browser or the like loaded on customer system 18. Specifically, customer 16 will use the browser to navigate to a web page for transaction management system 42. Then, using the functionality provided by profile system 46, customer 16 will create his/her profile. Part of creating the profile will typically include providing a user identification and password for customer 16 to later log into transaction management system 42. Providers 22 will also create a profile in a similar fashion. Although not shown for brevity purposes, provider 22 can utilize "provider systems" (e.g., computerized devices/systems) that include web browsers to navigate to a web page for transaction management system 42. Once providers 22 have created their profiles, they can browse transaction management system 42 to, among other things, view and provide updates for any assigned tasks.

Figure 2:
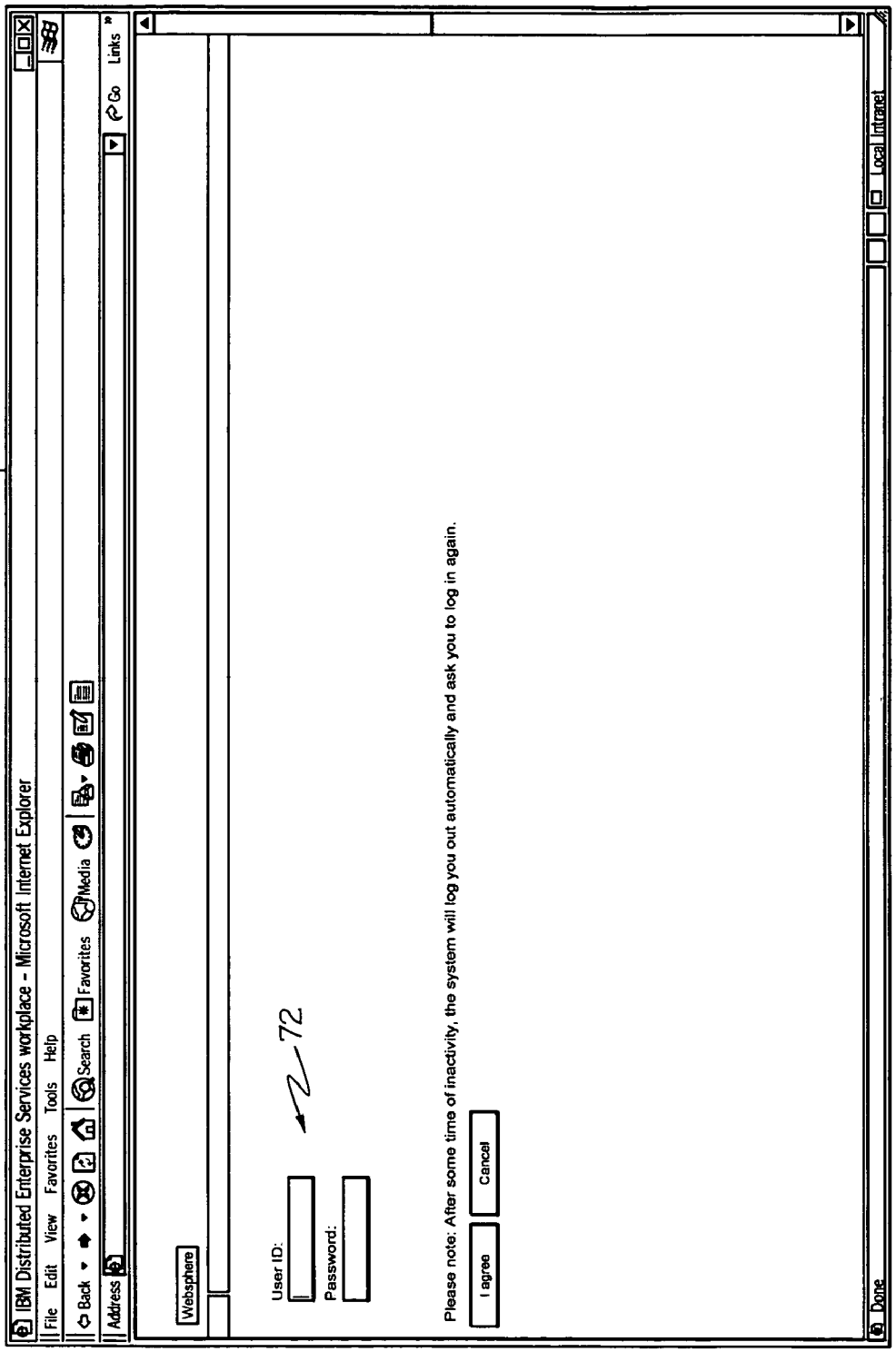
FIG. 2 depicts an illustrative login page according to the present invention.
Figure 3:
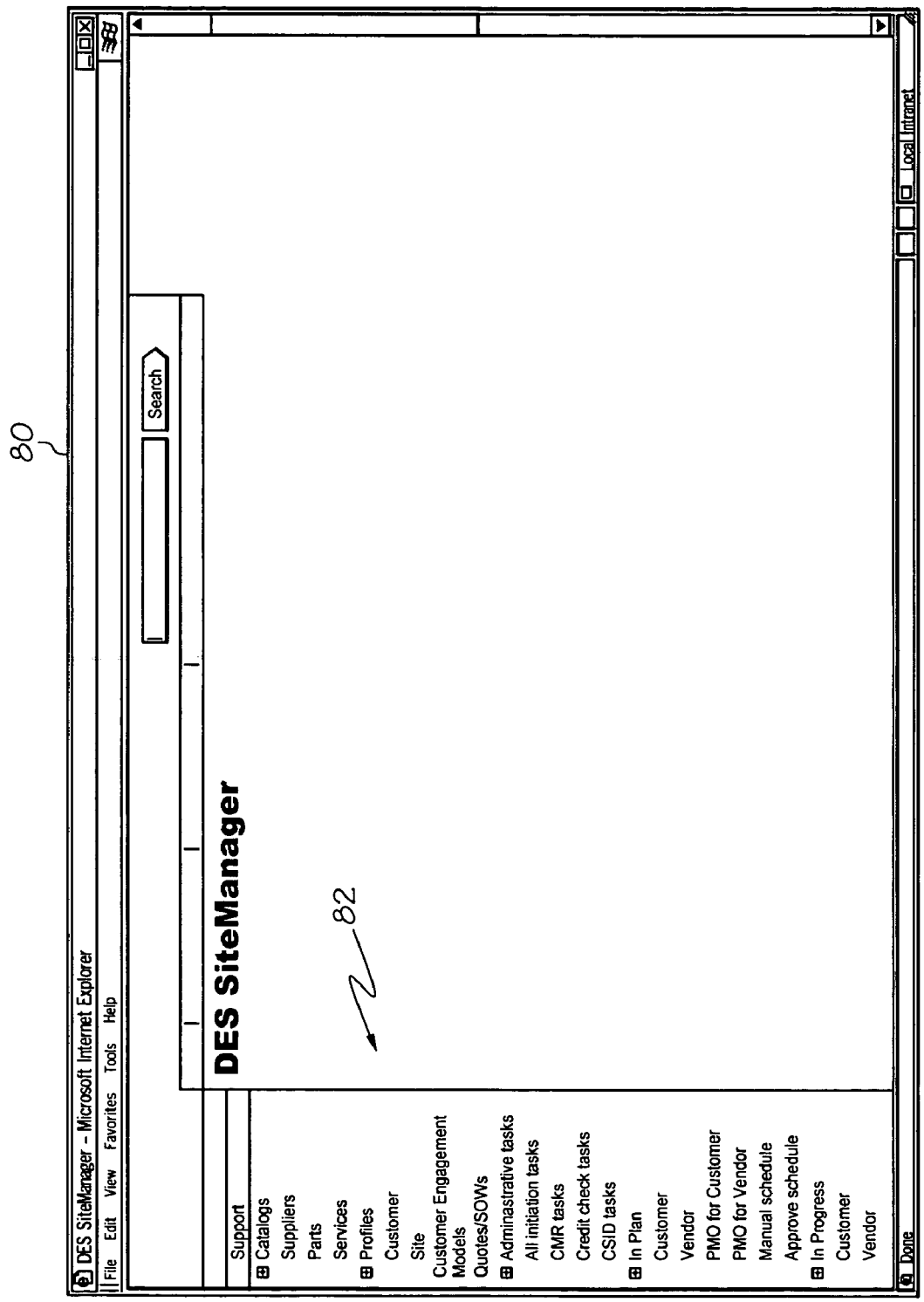
FIG. 3 depicts an illustrative management page according to the present invention.

Referring briefly to FIG. 2, an illustrative log-in page 70 is shown. As depicted, log-in page 70 has fields for customer 16 (FIG. 1) to input credentials such as a user identification and password, which upon validation, will provide customer 16 with access to transaction management system 42 (FIG. 1). Once logged in, customer 16 can be presented with a menu of options similar to menu 82 of management interface page 80 shown in FIG. 3. As shown in menu 82, customer 16 can select from several different options including "calatogues," "profiles," etc.

In any event, referring back to FIG. 1, assume that customer 16 has logged into transaction management system 42 and wishes to request composite service "A." The request can be made via transaction management system 42, or via voice (e.g., using an IVR). In any event, assume that customer 16 utilized the web to select composite service "A." In this case, the request will be received by request handling system 48. Upon receipt, it will be passed to order management system 50, which will define/determine a delivery task list 24 of the one or more tasks that are required to fulfill the request. Thereafter, order management system 50 will create a service order (which can be stored in database/record 5) for providers 22 to fulfill the tasks of delivery task list 24. For example, it could be that composite service "A" requires tasks "1-3" which can be performed by providers "X", "Y", and "Z" respectively. Order management system 50 will create a service order for procuring tasks "1-3" from their respective providers "X-Z." It should be appreciated that delivery task list 24 could have a sequence of tasks in which a performance of one task in the sequence is dependent upon a completion of a previous task in the sequence. As will be further explained below, the present invention allows for such sequencing.

In any event, once delivery task list 24 has been determined/defined and the service order has been created, the service order can be placed into a planning/pending state (e.g., in database/record 5), while the tasks from delivery task list 24 are assigned to the appropriate providers 22. In assigning providers 22 to the tasks, order management system 50 will also define a schedule for individually performing the tasks. The schedule will generally include start and end dates for beginning and completing the tasks. As indicated above, the schedule will include any needed lead time so that re-planning is limited and is based upon the resolution of any exceptions. Once the schedule is defined, it should be approved by customer 16 before performance begins. As such, the service order can be moved by order management system 50 (e.g., to database/record 7) to a status that reflects the awaiting of customer 16 concurrence of the schedule. To this extent, customer 16 can be notified electronically by order management system 50 (or by any other means) to log into transaction management system 42 and approve the schedule. Upon approval from the customer, the service order is moved by order management system 50 into a live service order status (e.g., in database/record 7).

At this point queue system 52 will begin individually and sequentially placing the tasks in queues 62 for the providers 22 to which they are assigned for activation and completion. As the tasks are completed by the providers 22, data is integrated from completed tasks to the appropriate databases/records and made available for the next operation. The next operation within delivery task list 24 is automatically triggered to fall into the appropriate queue 62. To this extent, as mentioned above, the tasks could be in a certain sequence whereby the performance of one task is dependent on the completion of a previous task. An example of this would be if a current task requires that certain parts be on hand. Thus, the current task cannot be performed until the parts are ordered and on hand. Queue system 52 will ensure that the sequence is maintained by not placing a dependent task in a queue 62 for performance until its required predecessor task is complete.

As the tasks are being performed, their statuses will be monitored by status tracking system 54. This not only allows customer 16 to log in and view the status of the tasks and the progress being made, but it also allows for error or exception handling. For example, if a task is not started on time, then an exception is sent by status tracking system 54 to a different work queue (database) that is monitored by administrator 20. The administrator 20, based upon the exception type, knows what to do to clear the exception so the service can continue to be completed. In general, failure to perform tasks as expected (exceptions) during delivery execution are classified in one of three or more exception levels: (1) those which can be handled within the context of an individual service; (2) those where coordination constraints require re-planning of multiple services to complete the composite service; and (3) those where completion of the composite service is not possible under the terms and conditions agreed with the customer.

In any event, assume that the service order has been completed as planned (e.g., all tasks for composite service "A" have been completed according to the schedule). At this point, corresponding data is updated by order completion system 56 (e.g., the completion times/dates are noted for each task, etc.), and customer 16 is notified. In addition, a customer satisfaction and approval survey can be triggered to be sent to customer 16 by survey system 58. In a typical embodiment, customer 16 is notified via an email to complete the survey on the website. The survey can poll customer 16 for any type of information/feedback about the process including, among other things: (1) the ease of use of transaction management system 42; (2) the level of performance of tasks; (3) the adherence to the schedule, etc. Upon completion of the survey, the composite service is completed and the data is retained within the corresponding database/record for the life of the customer project.

Upon approval from customer 16, the appropriate data associated with the service order is updated as customer approved, and invoicing system 60 will then send billing information to the appropriate service providers 22. Thereafter, invoicing system 60 will generate invoices for customer 16. If customer 16 has a support or maintenance contract, appropriate serial number and other related data are sent to support application databases and entitlement databases.

Figure 4:
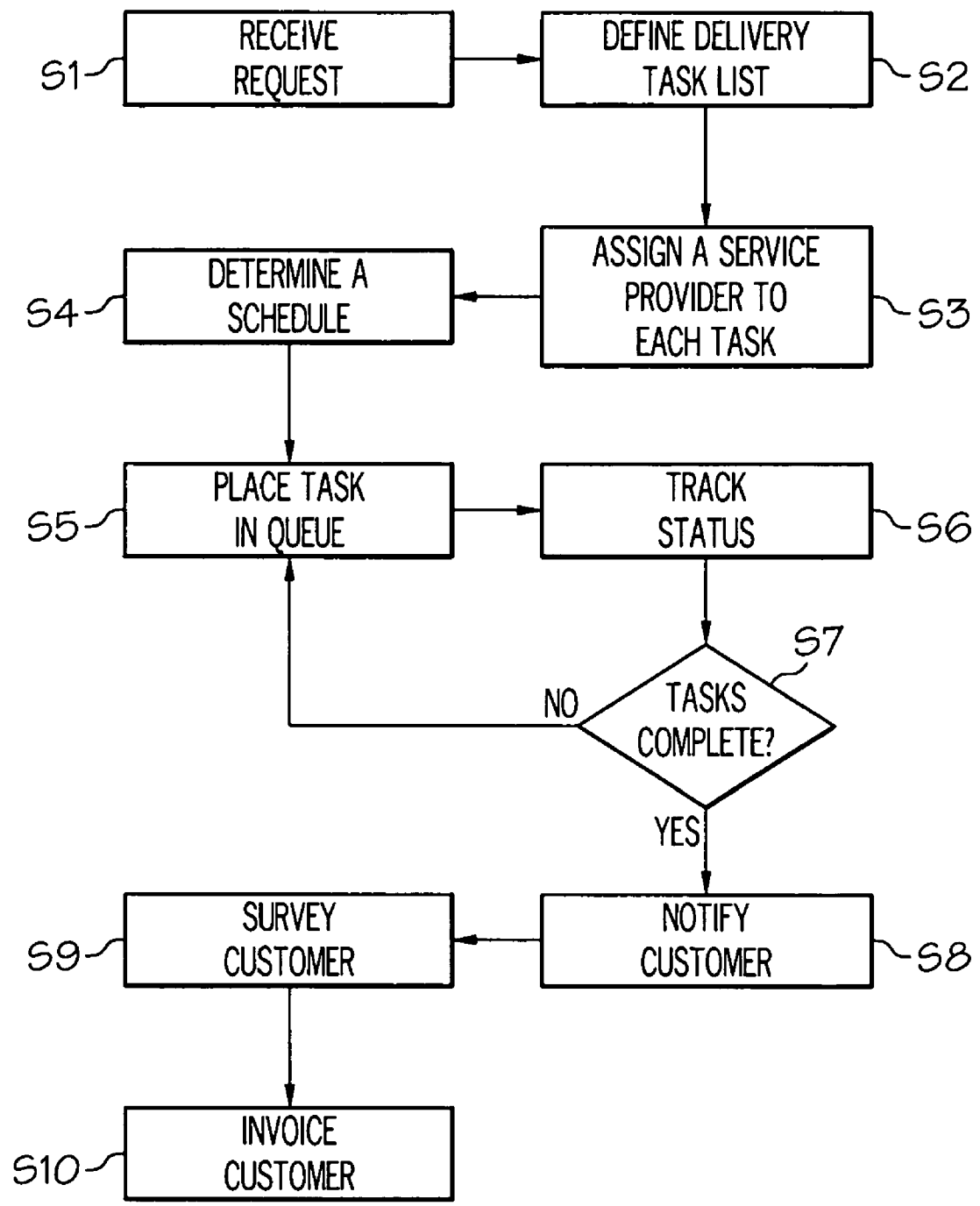
FIG. 4 depicts a method flow diagram according to the present invention.

Referring now to FIG. 4, a method flow diagram according to the present invention is shown. As depicted, first step S1 in method is to receive a request for a composite service. Second step S2 is to define a delivery task list 24 (FIG. 1) having one or more tasks required to fulfill the request. Third step S3 is to assign a service provider to perform each of the tasks. Fourth step S4 is to determine a schedule for individually performing each of the tasks. Fifth step S5 is to individually and sequentially place tasks in queues for appropriate providers. Sixth step S6 is to track a status of each of the tasks. As mentioned above, any failures to maintain the schedule are classified into one of a plurality of exception levels. In seventh step S7, it is determined whether all tasks in the task list 24 are complete. If not, the process returns to fifth step S5. If, however, all tasks are complete, eighth step S8 is to notify the customer of the completion, ninth step S9 is to survey the customer and tenth step S10 is to invoice the customer.

While shown and described herein as a method and system for managing requests for customers, it is understood that the invention further provides various alternative embodiments. For example, in one embodiment, the invention provides a computer useable/readable medium that includes computer program code to enable a computer infrastructure to manage requests for customers. To this extent, the computer useable or computer readable medium includes program code that implements each of the various process steps of the invention. It is understood that the terms "computer readable medium" or "computer useable medium" comprise one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 32 (FIG. 1) and/or storage systems 40 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to manage requests from a customer. In this case, the service provider can create, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method for managing requests for customers. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer-implemented method for managing a request for a customer, comprising:
    receiving the request from the customer at a computer running an application, the request comprising a request for a composite service;
    defining, using the application, a delivery task list comprising one or more tasks required to fulfill the request for the composite service, wherein the composite service includes plurality of parameters, at least one of which has been customized by the customer, the parameters including: available service providers and a quality level;
    assigning, using the application, a service provider to perform each of the one or more tasks, at least one service provider having been selected by the customer;
    determining, using the application, a schedule for individually performing each of the one or more tasks and sending the schedule to the customer for approval;
    tracking, using the application, a status of each of the one or more tasks, wherein any failure to maintain the schedule is classified into one of a plurality of exception levels and allowing the customer to view the status of each of the one or more tasks; and
    notifying, using the application, the customer upon completion of the one or more tasks.

2. The method of claim 1, wherein the application is a web portal application.

3. The method of claim 1, further comprising creating a profile for the customer, wherein the profile includes at least a user identification and a password.

4. The method of claim 1, further comprising creating an order to fulfill the request after the receiving step.

5. The method of claim 1, further comprising automatically placing each of the one or more tasks into a queue for the service provider to which the respective task is assigned.

6. The method of claim 5, wherein the delivery task list comprises a sequence of tasks, wherein a performance of at least one task in the sequence is dependent upon a completion of a previous task in the sequence, and wherein the at least one task is placed in the queue for the service provider to which it is assigned only upon the completion of the previous task.

7. The method of claim 1, wherein data corresponding to the request, data corresponding to the customer and data corresponding to the service provider are maintained in separate records.

8. The method of claim 1, further comprising surveying and invoicing the customer upon completion of all of the one or more tasks in the delivery task list.

9. A system comprising:
at least one computer device configured to implement a method for managing a request for a customer, the method including:
receiving the request from the customer, the request comprising a request for a composite service;
defining a delivery task list comprising one or more tasks required to fulfill the request for the composite service, wherein the composite service includes plurality of parameters, at least one of which has been customized by the customer, the parameters including: available service providers and a quality level;
assigning a service provider to perform each of the one or more tasks, at least one service provider having been selected by the customer;
determining a schedule for individually performing each of the one or more tasks and sending the schedule to the customer for approval;
tracking a status of each of the one or more tasks, wherein any failure to maintain the schedule is classified into one of a plurality of exception levels and allowing the customer to view the status of each of the one or more tasks; and
notifying the customer upon completion of the one or more tasks.

10. The system of claim 9, the method further comprising creating a profile for the customer, wherein the profile includes at least a user identification and a password.

11. The system of claim 9, the method further comprising comprising creating an order to fulfill the request.

12. The system of claim 9, the method further comprising automatically placing each of the one or more tasks into a queue for the service provider to which the respective task is assigned.

13. The system of claim 12, wherein the delivery task list comprises a sequence of tasks, wherein a performance of at least one task in the sequence is dependent upon a completion of a previous task in the sequence, and wherein the at least one task is placed in the queue for the service provider to which it is assigned only upon the completion of the previous task.

14. The system of claim 9, wherein data corresponding to the request, data corresponding to the customer and data corresponding to the service provider are maintained in separate records.

15. The system of claim 9, the method further comprising invoicing the customer upon completion of all of the one or more tasks in the delivery task list.

16. A program product stored on a non-transitory computer readable medium for managing a request for a customer, the non-transitory computer readable medium comprising program code for causing a computer device to perform the following functions:
receive the request from the customer, the request comprising a request for a composite service;
define a delivery task list comprising one or more tasks required to fulfill the request for the composite service, wherein the composite service includes plurality of parameters, at least one of which has been customized by the customer, the parameters including: available service providers and a quality level;
assign a service provider to perform each of the one or more tasks, at least one service provider having been selected by the customer;
determine a schedule for individually performing each of the one or more tasks and sending the schedule to the customer for approval;
track a status of each of the one or more tasks, wherein any failure to maintain the schedule is classified into one of a plurality of exception levels and allowing the customer to view the status of each of the one or more tasks; and
notify the customer upon completion of the one or more tasks.

17. The program product of claim 16, wherein the computer usable medium further comprises program code for causing the computer to create a profile for the customer, wherein the profile includes at least a user identification and a password.

18. The program product of claim 16, wherein the computer usable medium further comprises program code for causing the computer to create an order to fulfill the request.

19. The program product of claim 16, wherein the computer usable medium further comprises program code for causing the computer to automatically place each of the one or more tasks into a queue for the service provider to which the respective task is assigned.

20. The program product of claim 19, wherein the delivery task list comprises a sequence of tasks, wherein a performance of at least one task in the sequence is dependent upon a completion of a previous task in the sequence, and wherein the at least one task is placed in the queue for the service provider to which it is assigned only upon the completion of the previous task.

21. The program product of claim 16, wherein data corresponding to the request, data corresponding to the customer and data corresponding to the service provider are maintained in separate records.

22. The program product of claim 16, wherein the computer usable medium further comprises program code for causing the computer to invoice the customer upon completion of all of the one or more tasks in the delivery task list.

23. A method for deploying an application for managing a request for a customer, comprising:
providing a computer infrastructure including at least one computer being operable to:
receive the request from the customer, the request comprising a request for a composite service;
define a delivery task list comprising one or more tasks required to fulfill the request for the composite service, wherein the composite service includes plurality of parameters, at least one of which has been customized by the customer, the parameters including: available service providers and a quality level;
assign a service provider to perform each of the one or more tasks, at least one service provider having been selected by the customer;
determine a schedule for individually performing each of the one or more tasks and sending the schedule to the customer for approval;
track a status of each of the one or more tasks, wherein any failure to maintain the schedule is classified into one of a plurality of exception levels and allowing the customer to view the status of each of the one or more tasks; and
notify the customer upon completion of the one or more tasks.

24. A web portal application embodied in a non-transitory computer readable medium for managing a request for a customer, the web portal application comprising instructions to cause a computer device to perform the following functions:
receive the request from the customer, the request comprising a request for a composite service;

define a delivery task list comprising one or more tasks required to fulfill the request for the composite service, wherein the composite service includes plurality of parameters, at least one of which has been customized by the customer, the parameters including: available service providers and a quality level;

assign a service provider to perform each of the one or more tasks, at least one service provider having been selected by the customer;

determine a schedule for individually performing each of the one or more tasks and sending the schedule to the customer for approval;

track a status of each of the one or more tasks, wherein any failure to maintain the schedule is classified into one of a plurality of exception levels and allowing the customer to view the status of each of the one or more tasks; and notify the customer upon completion of the one or more tasks.

\* \* \* \* \*